United States Patent [19]

Scott et al.

[11] Patent Number: 4,709,373
[45] Date of Patent: Nov. 24, 1987

[54] LASER EXCITATION SYSTEM

[75] Inventors: Peter B. Scott, Bedford, Mass.; Kristian Hohla, Herrsching, Fed. Rep. of Germany

[73] Assignee: Summit Technology, Inc., Watertown, Mass.

[21] Appl. No.: 796,602

[22] Filed: Nov. 8, 1985

[51] Int. Cl.[4] .............................................. H01S 3/097
[52] U.S. Cl. .......................................... 372/86; 38/81; 38/83
[58] Field of Search ...................... 372/86, 81, 87, 57, 372/83, 38, 82

[56] References Cited

U.S. PATENT DOCUMENTS

| 3,449,694 | 6/1969 | Bell | 331/94.5 |
|---|---|---|---|
| 3,477,038 | 11/1969 | Shimazu | 331/94.5 |
| 3,702,973 | 11/1972 | Daugherty et al. | 331/94.5 |
| 3,721,915 | 3/1973 | Reilly | 331/94.5 |
| 3,842,366 | 10/1974 | Gordon et al. | 331/94.5 |
| 3,883,818 | 5/1975 | Heising et al. | 372/56 |
| 4,283,686 | 8/1981 | Daugherty | 372/35 |
| 4,301,425 | 11/1981 | Sze | 372/57 |
| 4,317,087 | 2/1982 | Sander et al. | 372/57 |
| 4,318,056 | 3/1982 | Sze | 372/57 |
| 4,334,199 | 6/1982 | Ham | 372/57 |
| 4,340,968 | 7/1982 | Willis et al. | 372/60 |
| 4,348,647 | 9/1982 | Nigham et al. | 372/74 |
| 4,393,505 | 7/1983 | Fahlen | 372/57 |
| 4,417,342 | 11/1983 | McKee | 372/87 |
| 4,425,654 | 1/1984 | Dible et al. | 372/86 |
| 4,426,706 | 1/1984 | Liu et al. | 372/86 |
| 4,503,542 | 3/1985 | Cirkel et al. | 372/87 |
| 4,601,039 | 7/1986 | Sze | 372/83 |

OTHER PUBLICATIONS

S. Howells et al; "A Medium PRF UV Preionised TEA $CO_2$ Laser"; J. Phys. E: Sci. Instrum., vol. 14, No. 3, Mar. 1981; pp. 293–295.

Primary Examiner—James W. Davie
Assistant Examiner—Bertha Randolph
Attorney, Agent, or Firm—Thomas J. Engellenner

[57] ABSTRACT

A laser excitation system is disclosed in which the laser medium is preionized by a UV-generating spark array and is excited by an electric avalanche discharge. The preionized state is sustained during the discharge by a second spark array and an isolated discharge capacitance. In this manner, a continuous ionization state during discharge is achieved.

10 Claims, 6 Drawing Figures

LASER EXCITATION SYSTEM

BACKGROUND OF THE INVENTION

The technical field of the invention pertains generally to lasers and more particularly to preionized excimer laser devices and the like.

Excimer or "excited dimer" lasers are pulsed gas lasers which typically employ mixtures of halogens and rare gases, together with buffer gases and other additives to create an active medium. When pumped to an electronically excited state, the rare gas and halogen ions form dimer molecules. These molecules emit high intensity, short wavelength radiation when they relax and return to the dissociated ground state.

One method of exciting the active medium of an excimer laser is by an avalanche electric discharge. In an electric avalanche discharge laser, the medium is excited by a flow of electrons from a high voltage electrode across the medium to ground. Electric avalanche discharge lasers offer substantial promise for research and medical applications, in particular, because they can yield convenient energy outputs with very fast pulse repetition rates.

Most excimer lasers that emplgy avalanche electric discharges also "preionize" the medium. Preionization permits the deposition of additional energy per pulse and, hence, higher output power densities. Conventional techniques for preionization employ a spark array to generate ultraviolet radiation. Such preionization circuits typically terminate operation as soon as the avalanche discharge commences.

A number of factors, however, limit the efficiencies, pulse lengths and pulse rates of presently available electric discharge excimer lasers. Typically, the avalanche discharge lasts for about 20 to 30 nanoseconds before heating and instabilities result in arcs that terminate the laser output.

There exists a need for better lasers, particularly excimer lasers and the like. There exists a need for better ionization schemes that would sustain pumping by avalanche discharge techniques and, thereby increase beam uniformity at high repetition rates.

SUMMARY OF THE INVENTION

A laser excitation system is disclosed in which the laser medium is preionized by a UV-generating spark array and is excited by an electric avalanche discharge. The preionized state is sustained during the discharge by a second spark array and an isolated discharge capacitance. In this manner, a continuous ionization state during discharge is achieved.

A laser excitation system according to the present invention consists of a first array of preionizing spark-inducing elements, preferably formed by a set of metal (i.e., stainless steel) pins separated by narrow gaps (i.e., 0.5–5 millimeters). One side of the first spark array receives the high voltage pulse and the other side is electrically connected to a floating electrode. The invention also includes a second array spark-inducing elements, again preferably formed by a second set of metal pins separated by narrow gaps. The pins which form one side of the second spark array are electrically connected to the floating electrode and the set of pins which form the other side are connected to a series of sustainer capacitors (e.g. ceramic doorknob type capacitors). The first and second spark arrays serve to preionize the medium by generating ultraviolet radiation within the chamber. As electricity passes across the first and then the second spark array, charge builds up on the sustainer capacitors until an avalanche electric discharge occurs between the floating electrode and a fixed potential (typically grounded) electrode. The avalanche discharge induces lasing in the medium. During the discharge, the preionized state is sustained by the second spark array as the charge stored on the sustainer capacitors flows back thorough the second array to the floating electrode, where it is discharged across the medium to ground.

In one preferred embodiment, the first and second arrays consist of a plurality of paired sets of spark-inducing elements connected in parallel to a high voltage pulse-forming network and disposed at regular intervals along the discharge electrodes. Preferably the first and second spark inducing elements of each set are disposed on opposite sides of the discharge region and each paired set is also connected in parallel to an individual sustainer capacitor.

The high voltage pulse-forming network can include a high voltage source, one or more primary storage capacitors, a thyratron switch, one or more peaking capacitors, and a saturable magnetic switch which serves as a current pulse compressor. It is also preferable to link the high voltage pulse-forming network to the laser excitation system via decoupling inductance elements to avoid reverse flow of current back from the floating electrode across the first spark array.

In one preferred embodiment, the high voltage supply, thyratron, magnetic switch and pulse-shaping capacitors are encased by a first containment stage and pressurized to about two or more times the normal atmosphere pressure. The laser vessel, itself, with the rare gas and halide mixture, can then be pressurized to higher pressure within a second containment system.

It is also preferred that the first containment system, housing the high voltage components, be pressurized with a high dielectric constant gas to permit low inductance circuitry. Such high dielectric constant gases include, without limitation, sulfur hexafluoride and nitrogen. The use of such gases can elminate ozone production due to corona effects and allows closer packing of the high voltage components. These factors together permit higher operational voltages (i.e., up to 40 kV or more) and, thereby, increase volumetric energy extraction. Moreover, the two stage pressurization system of the present invention permits differential pressure adjustment of the laser medium.

The gas medium for the laser vessel or head is preferably pressurized to a higher pressure, for example, about three or more times normal atmospheric pressure, to further increase volumetric energy extraction. The gas media useful for lasers according to the present invention include, without limitation, Argon-Fluoride mixtures, Argon-Helium mixtures, Xenon-Fluoride mixtures, Xenon-Chloride mixtures, Xenon-Bromide mixtures, Krypton-Fluoride mixtures and Krypton-Chloride mixtures.

The invention will next be described in connection with certain preferred embodiments; however, it should be clear that various changes and modifications can be made without departing from the spirit or scope of the invention. For example, the number and spacing of excitation elements can vary. Moreover, although the invention is described in connection with various excimer laser media, other gas mixtures that lase in response to electrical excitation can apply the teachings of the present invention; such gaseous media include, without limitation, chemical lasers, halogen and rare gas ion lasers, nitrogen lasers and carbon dioxide lasers. Additionally, excimer gas mixtures useful in the present invention can also include various buffers, such as helium or argon buffers, and various additives, for enhanced performance.

DETAILED DESCRIPTION

Figure 1:
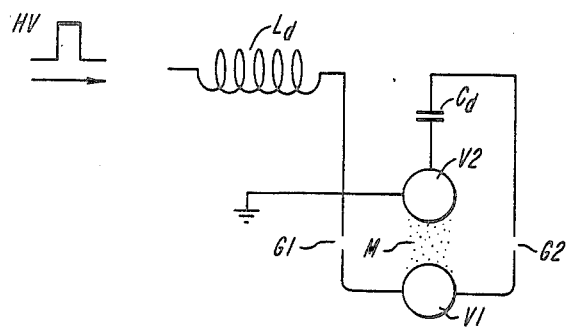
FIG. 1 is a simplified electrical schematic diagram of an excitation system according to the invention.

In FIG. 1 the operation of a laser excitation system according to the invention is illustrated generally by a simplified electrical schematic diagram. An object of the present invention is to sustain and maximize the laser output resulting from a discharge between a floating electrode V1 and a fixed potential (e.g. grounded) electrode V2. The excitation system includes a decoupling inductance Ld, a first spark-inducing element G1, a second spark-inducing element G2 and a discharge-sustaining capacitance Cd. In operation a high voltage pulse HV, passes through the inductance Ld, the first spark-inducing element G1 and then the second spark-inducing element G2 to charge the capacitance Cd.

As the current passes through spark-inducing elements G1 and G2, the laser medium M is preionized. Charge builds up on the capacitance Cd until an avalanche discharge occurs from electrode V1 to V2, thereby inducing lasing in the volume of the medium M situated between the electrodes. During the discharge, the preionized state is sustained by the second spark-inducing element G2 as current flows back through it to the floating electrode V1. Inductance Ld prevents the current from flowing back through the first spark-inducing element G1, thereby protecting the high voltage source and pulse-forming network (not shown) which generates the pulse HV.

Figure 2:
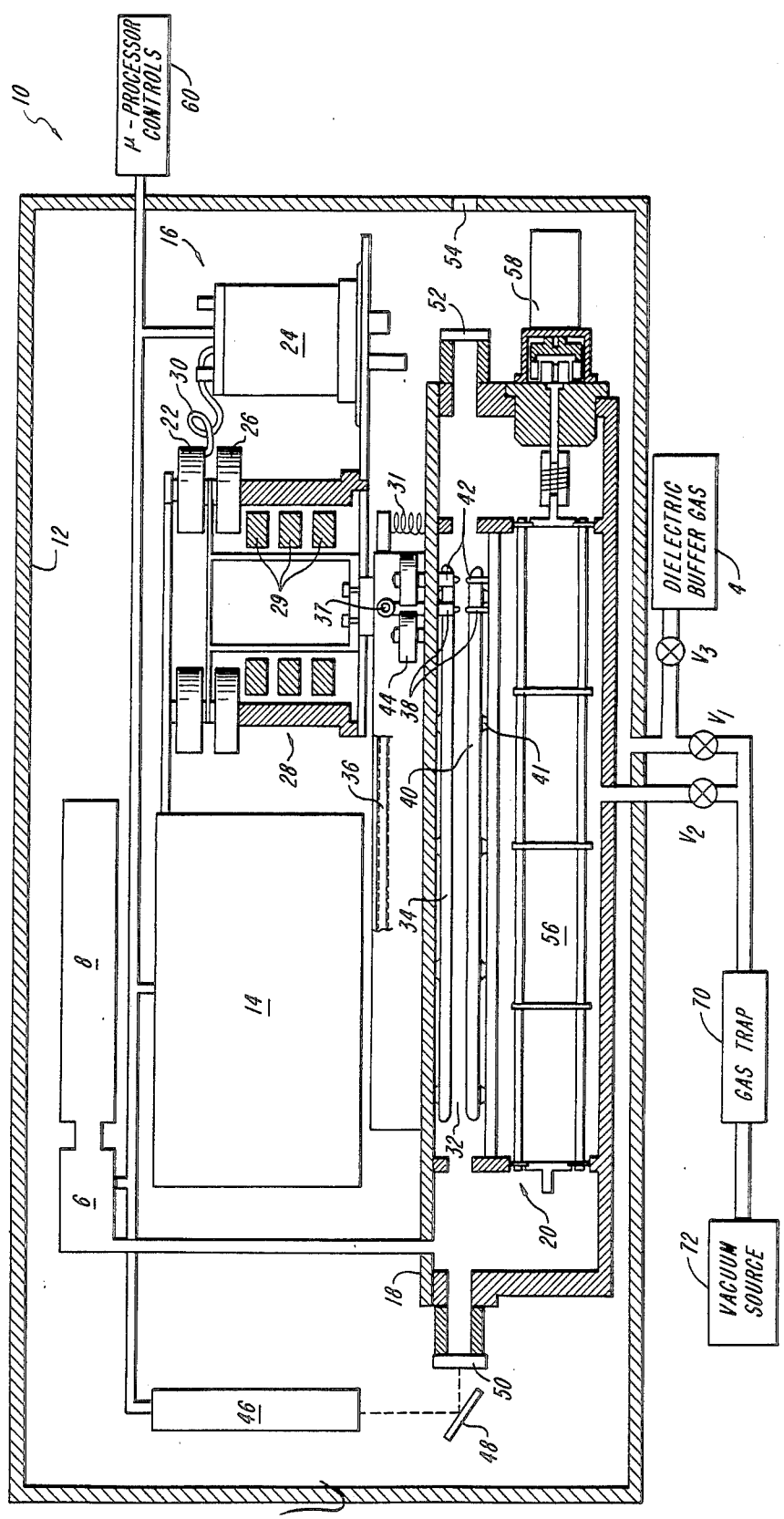
FIG. 2 is an overall schematic diagram of a laser system according to the invention.

In FIG. 2 a more detailed illustration of a laser system 10 is shown, consisting of a primary containment vessel 12, encasing a high voltage supply 14, a pulse-forming network 16 and a secondary containment vessel 18 (with a laser head assembly 20 therein). The primary containment vessel 12 is preferably filled with a high dielectric constant gas 4, such as sulfur hexafluoride via value V3 and pressurized to about to 2-4 atmospheres. The secondary containment vessel contains the laser medium, for example, an argon fluoride mixture, and can be further pressurized to about 3-6 atmospheres. The gas tank 8 containing the laser gas is preferably housed within the primary containment vessel 12 for added safety and the gas is metered into the secondary containment vessel 18 via regulator 6. Valves V1 and V2 are coupled to a gas (scrubber) trap 70 and a vacuum 72 source to permit the safe evacuation of the vessels 12 and 18.

Additionally, as shown in FIG. 2 the pulse forming network of the present invention includes primary main storage capacitors 22, a thyratron switch 24, secondary main storage capacitors 26 and a saturable magnetic switch 28. In operation, the high voltage source delivers DC high voltage at of about 1 kilojoule per second at 40 V which charge capacitors 22. In one embodiment the primary storage capacitors can be formed by eight parallel-connected capacitors of about 2.5 nano-farads each. After the capacitors 22 are charged, the thyratron switch (typically rated at 35 kV at 3–5 kA) is triggered to discharge the capacitors into a second set of storage capacitors 26 (similarly a set of eight, 2.5 nano-farad capacitors) which fed the saturable magnetic switch 28.

The saturable switch 28 can be formed, for example, by an coaxial transmission line having a plurality of metal-impregnated core elements 29. The saturable switch 28 impedes the current flow until it saturates and then acts as a short circuit. The cummulative effect of the pulse forming network is to compress the initial high voltage pulse of about 600 nano-seconds into a pulse of about 60 nano-seconds. Also shown in FIG. 2 is a coil 30 of about 10 millihenry coupling the thyratron switch 24 to the high voltage source 14 in order to smooth the initial current pluse through the switch 24 and thereby prolong its useful lifetime. By varying the number of turns in coil 30, the voltage-time product associated with the charge transfer from the primary main storage capacitors 22 to the secondary capacitors 26 can be controlled. An initializing inductor 31 can also be employed to ground the common side of the primary capacitors 22 and the secondary capacitors 26, thereby providing a changing path and draining the secondary capacitor 26 between pulses.

The laser head assembly 20 is shown in FIGS. 2–5 as consisting of a laser medium 32, a grounded electrode 34, a plurality of decoupling inductors 37, a charge transfer bus 36, a first spark array 38, a floating electrode 40 (attached to, but electrically insulated from, support 41), a second spark array 42 and a series of sustainer capacitors 44. (For simplicity, only a few of the excitation elements are shown in FIG. 2) These elements operate as described above in connection with FIG. 1.

The secondary containment vessel 18 also includes mirrors 50, 52 which define the resonant cavity of the laser. Mirror 52 is partially transmissive and thereby allows extraction of the laser beam through output port 54. The mirrors 50, 52 can be formed, for example, by reflective coatings on calcium fluoride windows. Also disposed within the secondary containment vessel 18 is a blower turbine blade 56, operated by blower motor 58 to circulate the medium 32 between electrodes 34 and 40. Additionally, as shown in FIG. 2, a alignment laser 46 together with an adjustable mirror or prism element 48 can be disposed within the primary containment vessel 12. All of all electrical elements, as shown in FIG. 2, are preferably controlled by a microprocessor 60 or the like outside of the containment vessels.

Figure 3:
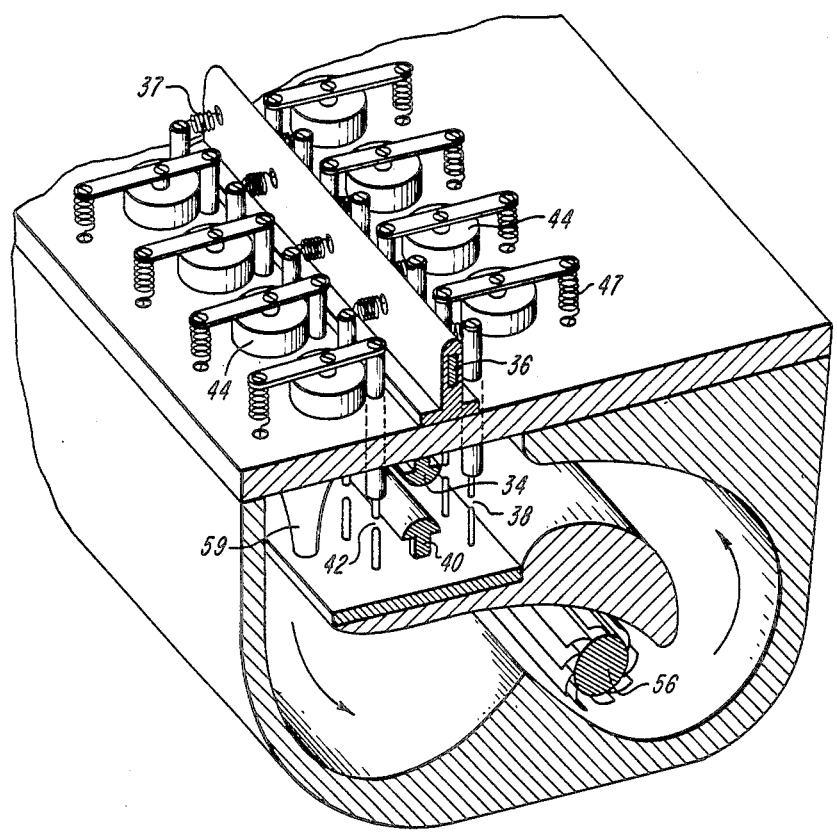
FIG. 3 is more detailed partial cross-sectional, isometric representation of a laser head for use in a laser system of FIG. 2.

FIG. 3, show the elements of the laser head assembly 20 in more detail. Charge is transferred to the excitation system of the present invention via bus bar 36 which is electrically connected in parallel to a plurality of first spark inducing elements 38 via a plurality of decoupling inductors 37. As described above the high voltage pulse passes through the floating electrode 40 to plurality of second spark inducing elements 42.

Figure 4:
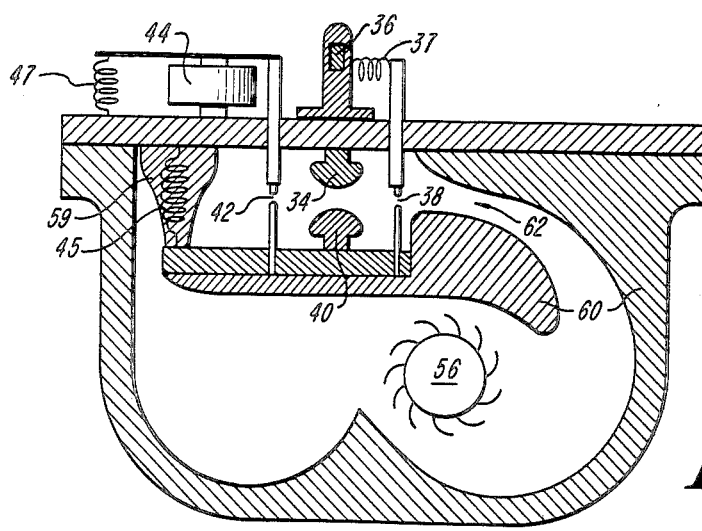
FIG. 4 is an end view of the laser head of FIG. 3.

FIG. 4 presents a side view of the laser, showing the relationship of the electrodes 34, 40 and two individual spark-inducing elements 38, 42 from the first and second arrays most clearly. Inductors 45 serve to ground the floating electrode 40 after each pulse while inductors 47 serve to drain the sustainer capacitors 44 between pulses. Also shown in FIG. 4 is a flow channel 60, preferably formed from a high temperature fluorocarbon polymer, such as Kynar, defining a flow nozzle 62.

Figure 5:
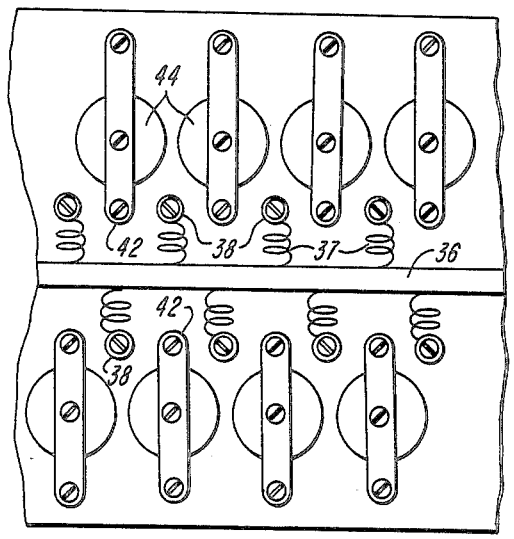
FIG. 5 is a top view of the laser head of FIG. 3.

In FIG. 5, a top view, one preferred arrangement of the first and second spark arrays is shown wherein the position of the sustainer capacitors 44 relative to the bus bar 36 (and hence the first and second spark-inducing elements) is alternated from one side to the other side along the length of the head assembly.

Figure 6:
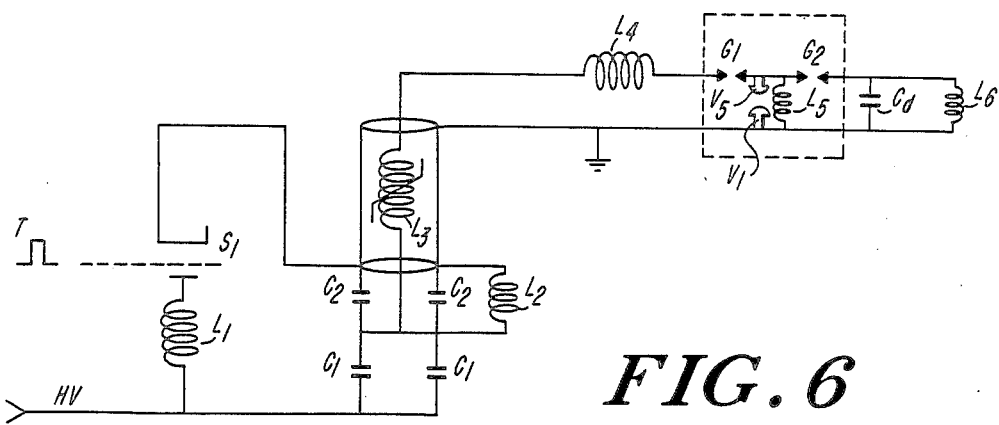
FIG. 6 is a more detailed schematic diagram of an excitation system for use with the laser head of FIG. 3.

In FIG. 6, a more detailed electrical schematic diagram is presented of the embodiment of the excitation system shown in FIGS. 2-5. In this system, the high voltage source HV charges a plurality of primary main storage capacitors C1 (identified as elements 22 in FIGS. 2-5 above). A trigger pulse T, triggers the thyratron switch S1 (identified as element 24 above) and causes the charge stored on the capacitors C1 to be transferred to the secondary storage capacitors C2 (identified as elements 26 above). The current controlling inductance L1 (identified as element 30 above) optimizes charge transfer from C1 to C2 while minimizing the stress on switch S1. The initializing inductance L2 (identified as element 31 above) grounds the common side of capacitor banks C1 and C2, thereby providing a charging path and draining capacitors C2 between pulses.

The charge on capacitors C2 is transferred to the laser head via saturable switch L3 (identified as element 28 above) and decoupling inductances L4 (identified as elements 37 above). The saturable switch L3 serves to compress the high voltage pulse while the decoupling inductances L4 prevent back-flow of current from the laser excitation elements to the high voltage pulse generating elements.

The laser excitation elements situated within the laser head (as depicted by the dotted enclosure in FIG. 6) include a floating electrode V1 (identified as element 40 above), a first spark array G1 (identified as elements 38 above), a second spark array G2 (identified as elements 42 above), and a ground electrode V2 (identified as element 34 above). Situated outside of the laser head but electrical connected to the elements inside are the sustainer capacitors Cd (identified as elements 44 above) and inductances L6 (identified as elements 47 above).

As the current passes from the decoupling inductance L4 through the spark-inducing elements G1 and G2, the laser medium is preionized. Charge builds up on the capacitors Cd until an avalanche discharge occurs from V1 to V2, thereby inducing laser action. The inductances L5 serve to ground the floating electrode V1 after each pulse while the inductances L6 serve to drain the sustainer capacitors Cd between pulses.

Obviously, many modifications and variations of the present invention are possible in light of the above teachings. Such additions, substitutions and other arrangements are intended to be covered by the appended claims.

What is claimed is:

1. An excitation system for applying a high voltage source to induce a discharge in a laser medium within a chamber, the excitation system comprising:
    a. At least one capacitor capable of storing an electric pulse from the high voltage source prior to discharge;
    b. a fixed potential electrode, capable of draining the electric pulse upon laser discharge;
    c. a floating electrode;
    d. a laser discharge region defined by a volume between the fixed potential electrode and the floating electrode;
    e. at least one first spark-inducing element, electrically connected to the high voltage source and the floating electrode, the first spark-inducing element serving to preionize the medium by generating ultraviolet radiation within the chamber during the charging of the capacitor; and
    f. at least one second spark-inducing element, electrically connected to the floating electrode and the capacitor, the second spark-inducing element serving to likewise preionize the medium by generating ultraviolet radiation within the chamber during the charging of the capacitor and also serving to sustain the generation of ultraviolet radiation within the chamber during laser discharge.

2. The system of claim 1 wherein the system further includes at least one inductor disposed between the high voltage source and the first spark-inducing element.

3. The system of claim 1 wherein the first spark-inducing element is defined by a first set of opposing pins separated by a first gap, one of said pins being electrically connected to the high voltage source and another of said pins being electrically connected to the floating electrode.

4. The system of claim 1 wherein the second spark-inducing element is defined by a second set of opposing pins, one of said pins being electrically connected to the floating electrode and another of said pins being electrically connected to the capacitor.

5. The system of claim 1 wherein a plurality of first spark-inducing elements and a corresponding plurality of second spark-inducing elements are disposed to form an array of preionizing elements within the laser discharge region.

6. The system of claim 2 wherein current transfer from the high voltage source is controlled by a thyratron switch.

7. The system of claim 2 wherein the current from the high voltage source is shaped by at least one pulse-shaping element disposed between the high voltage source and the first preionizing spark gap.

8. The system of claim 7 wherein the current is shaped by a saturable magnetic switch.

9. The system of claim 1 wherein the laser medium is an excimer medium.

10. The system of claim 9 wherein the excimer medium is a rare gas-halide mixture.

* * * * *